United States Patent [19]

Van Noord

[11] 3,712,149

[45] Jan. 23, 1973

[54] REAR VIEW MIRROR OPERATING MECHANISM

[75] Inventor: Andrew J. Van Noord, Grand Rapids, Mich.

[73] Assignee: Kent Engineering, Grand Rapids, Mich.

[22] Filed: April 30, 1971

[21] Appl. No.: 138,889

[52] U.S. Cl. ............................................. 74/501 M
[51] Int. Cl. .............................................. F16c 1/14
[58] Field of Search .......................... 74/501 M, 501

[56] References Cited

UNITED STATES PATENTS 2,928,318  3/1960  Friday ............................... 74/501 M
3,225,621  12/1965  Augunas ........................... 74/501 M Primary Examiner—Milton Kaufman
Assistant Examiner—F. D. Shoemaker
Attorney—Dale A. Winnie

[57] ABSTRACT

An operating mechanism for use with remote control rear view mirrors to allow fixed axes of pivotal support at the mirror location and preassembled use of sheathed control cables of fixed length therewith; said operating mechanism including a supporting member having pivotal means including first and second pivotal members at one end, with control cable ends attached to each thereof, reciprocal means on the other end of the supporting member including first and second reciprocal members biased in abutting relation against the ends of the cable sheathes, and a control lever attached to one of the pivotal members for selective actuation of both thereof.

6 Claims, 6 Drawing Figures

PATENTED JAN 23 1973

INVENTOR.
Andrew J. VanNoord
BY
Winnie & Romanski
ATTORNEYS

3,712,149

REAR VIEW MIRROR OPERATING MECHANISM

BACKGROUND OF THE INVENTION

Remotely controlled outside rear view mirrors for automobiles use sheathed cables and an operating mechanism, mounted inside the car, which allows finger touch control of the mirrors through a single lever operator to set both horizontal and vertical viewing angles.

This operating mechanism is normally quite complex and therefore expensive, both to manufacture and to assemble. A single pivot point mounting for the control lever is most commonly used because of its relative simplicity and it will allow the use of biasing means in the assembly to compensate for sheath expansion in installation which causes the effective length of operating cables to be shortened. However, this in turn makes for an overly sensitive finger touch control and one which can not obtain movement in one viewing plane without affecting the viewing angle in the other plane of reference.

With outside day-night rear view mirrors, where the same control lever is used to flip over the mirror from a day to a night viewing side, this disadvantage is even more serious. In a night driving situation, with the car behind having his lights on high beam, it is important to be able to change the rear view mirror to its night viewing capacity without losing the following car or being distracted as regards on-coming traffic, even momentarily.

Although the problem in the control mechanism can be avoided by having the compensating means for sheath expansion provided at the mirror, this is at the sacrifice of stability in the mirror mounting and/or is still without any cost savings in manufacture or assembly.

The real need is for a simplified control mechanism which involves as few parts as possible, which is easy to assemble, which can be preassembled with the sheathed cables attached to it and to the mirror assembly, and which affords distinct and separate control over the horizontal and vertical viewing angles of the mirror through a single operating lever that is finger-touch sensitive and still has frictional stability.

SUMMARY OF THE INVENTION

The present invention relates to an operating mechanism for remote control rear view mirrors, and one which is particularly well suited for use with outside day-night rear view mirrors, in which there are a minimum of parts to manufacture and assemble, to reduce costs in both instances, and in which precise control of the viewing angle of the mirror is retained in making any adjustments thereof.

The operating mechanism includes a supporting member with pivotal means provided at one end and reciprocal means mounted on the other end thereof. The pivotal means include a first member pivotal in a horizontal plane and a second member pivotal on the first in a vertical plane with each having cable ends attached to them. The pivotal means include frictional resistance for holding their settings but are still responsive to finger-touch control. The reciprocal means include first and second members that provide abutment shoulders for the ends of the cable sheaths and have spring means in compression acting against the supporting member, for holding them in yielding engagement therewith, and allow for the sheath expansion during installation of the preassembled mirror and its operating mechanism.

DETAILED DESCRIPTION OF THE DRAWINGS

DETAILED DESCRIPTION OF THE ILLUSTRATED EMBODIMENT

Figure 1:
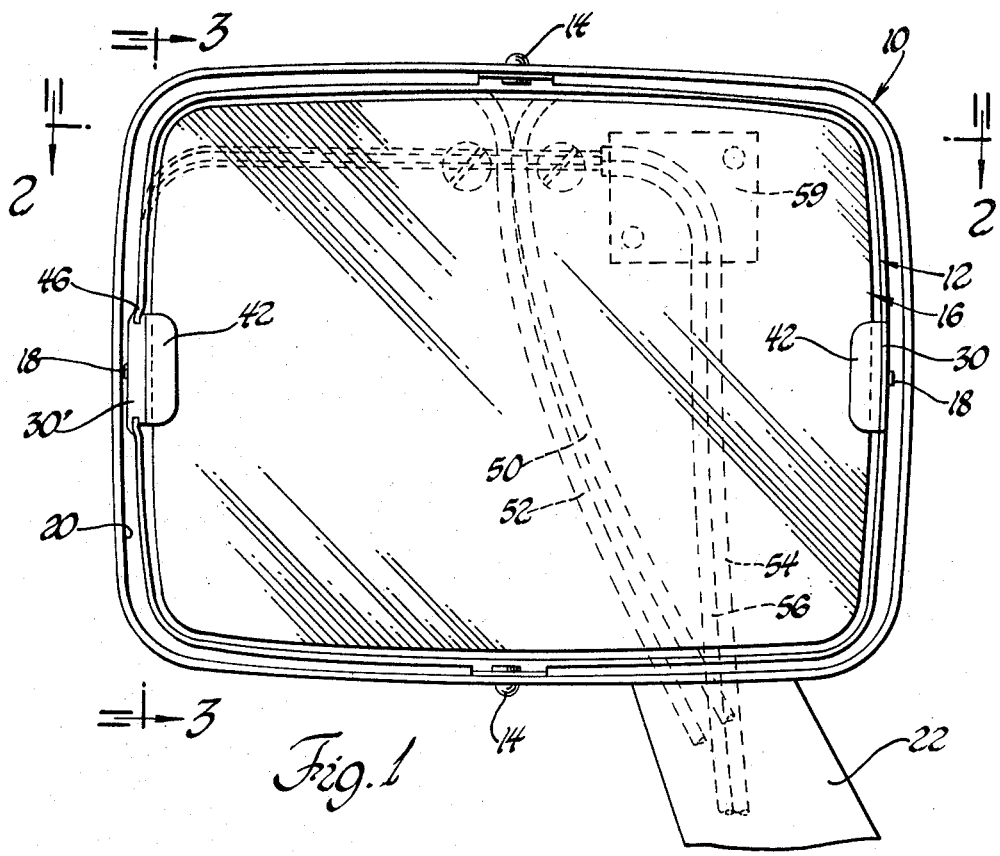
FIG. 1 shows a view looking into a day-night rearview mirror, as seen by a user.

The mirror structure shown in the drawings includes an outer housing or shell 10 within which is mounted a mirror supporting member 12 that is connected to the shell by vertically aligned pivot pin connections 14 and has a mirror member 16 pivotally and rotatably connected to it by horizontally aligned pivot pin connections 18.

The housing shell 10 is conventional in appearance, being of the type, general shape and approximate size, commonly used for outside remote control rear view mirrors. It has a rearwardly disposed opening 20 in which the mirror 16 is disposed and it is provided with an arm 22 by which it may be mounted on a vehicle door or fender wall panel.

The mirror supporting member 12 in the outer housing shell 10 has a back wall 24 that is semi-cylindrical in shape and side walls 26 that are engaged to it to provide an enclosed space within which the mirror 16 may be turned over. Tabs or ears 28, at the top and bottom ends of the curved back wall member 24 and between the sidewalls, are formed for the pivot connections 14 which provide the vertical axis for movement of the supporting member in the housing shell. Similar projections 30 and 30' are formed from the side walls 26 for the pivotal connections 18 that provide the horizontal axis about which the mirror member is operable.

Figure 2:
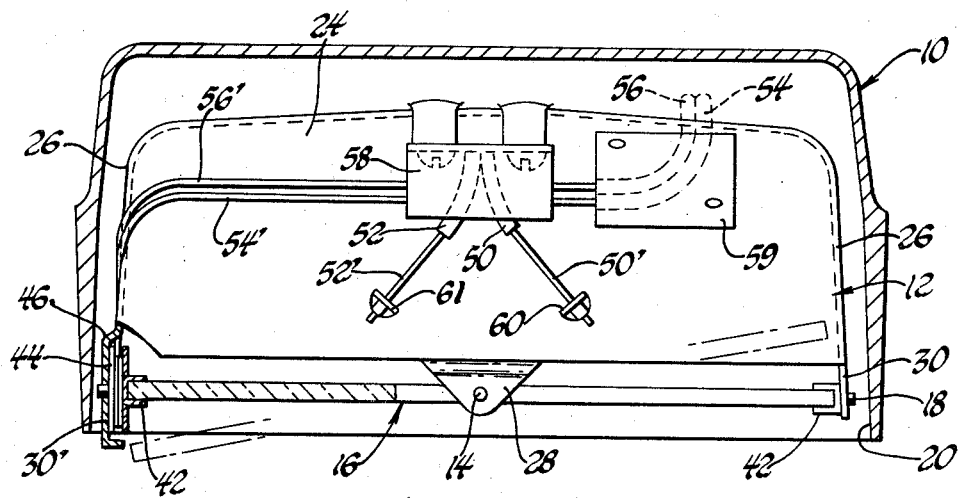
FIG. 2 is a top plan view of the same mirror as seen in the plane of line 2—2 in the first drawing figure.

In the particular embodiment shown, the vertical and horizontal axis for pivot movement and control of the mirror 16 intersect and are in a common plane, as best appreciated by reference to FIG. 2 (noting the relative location of pivotal connections 14 and 18). However, this intersecting relationship of the pivotal axis is not necessary to a practice of the invention. They can be relatively offset, other than straight up-and-down, or across and even reversed so that the mirror turns about a vertical axis, as for example, when its width is less than its length.

It should also be noted here that the mirror supporting member 12 need not have totally enclosing back and sidewalls as shown. The important thing is to provide space behind the mirror so that it can be turned over without having anything in its way. The solid back and sidewall form shown is particularly good in this respect and it has the further advantage of hiding the operating cables behind it and providing a more finished appearance for the end product. The operational aspects of the mirror, however, are not dependent on the particular structure shown.

The mirror 16 is made by having a piece of smoked glass, of the desired size and shape, provided with a bright chrome, or like highly reflected surface on one side. This assures a first surface bright image reflection from one side of the mirror and a first surface night viewing reflection from the other side of the mirror, right off the face of the smoked glass.

Although other day-night mirror constructions might be used, the type described is believed to be the simpliest and least expensive. Also, it will be appreciated that the relative thickness of the day-night mirror used will influence the clearance needed. Between its peripheral edge and the back wall structure, in order to turn it over. Too large a clearance space would mean problems with leaves, road dirt and winter ice and snow getting behind the reversible mirror.

As regards the winter ice and snow problem with the embodiment shown, the curved back wall 24 on the part that actually carries the mirror affords good drainage and run-off for rain water so that icing and winter freeze is seldom ever a problem.

Referring to FIGS. 1 and 2, it will be seen that small clips 42 are used on the side edges of the mirror 16 and in conjunction with the pivot pins 18; these serve to mount the mirror on the supporting member for both viewing adjustment and so it can be turned completely over.

At one side of the mirror 16, the clip 42 includes a sheave 44 that is used to adjust and turn the mirror over. The sidewall projection 30' is formed to accommodate the sheave and has an offset 46 which provides a protective recess for it and aligns it with openings 48 in the sidewall for the cable means engaged thereto.

The control cables for operating the mirror include one pair 50, 52 for turning it from side-to-side, by operating the mirror supporting member, and another pair 54,56 that are used to turn it over and adjust it up-and-down. They are sheathed cables with the actual operating strands identified 50'' 54' and 56', respectively, where they extend through the protective coverings.

The cable pair 50, 52 are received in the housing shell 10 through the mirror arm 22 and they are fastened to the back wall near the top by corner clamp 58. The clamp holds the ends of the sheaths but allows the operating strands 50' and 52' to extend therebeyond and to be attached to tabs 60 and 61 struck from the back wall part 24 of the mirror supporting member. The cable connections to the mirror supporting member are so disposed relative to the vertical axis about which it turns, as best shown in FIG. 2, that one or the other will turn it from side-to-side.

The other cable pair 54,56 are also received through the mounting arm 22 into the shell behind the mirror supporting member 12. However, they are retained on the back of the mirror supporting member 12 by a guide clamp 59 that enables them to turn with the supporting member with reasonable freedom and without interfering with its movement. They are also attached to the supporting member 12 relatively over the cable access in the mirror arm 22, and sufficiently highup, that there is enough cable length inside the housing shell to allow for lateral movement of the control cables and to avoid any axial movement that might cause cable wear where they are threaded into the shell through the arm 22.

Figure 3:
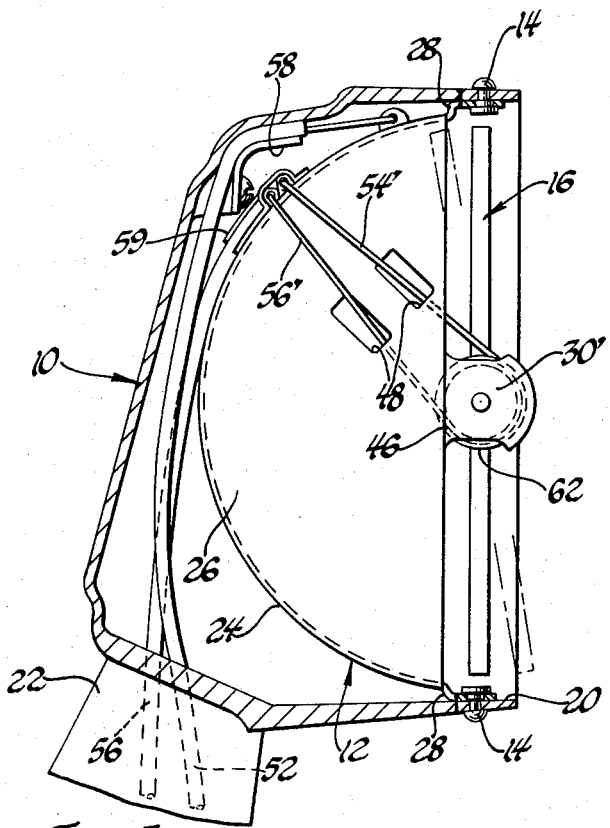
FIG. 3 is a side view of the mirror, through the outer housing cover, as seen in the plane of line 3—3 in FIG. 1 and looking in the direction of the arrows.

The cable strands 54' and 56' are actually one and the same joined and formed to provide a loop or bight 62 received about the sheave 44 to turn it and consequently the mirror 16, as best seen in FIG. 3.

FIG. 3 also shows how the mirror 16 is capable of viewing adjustment and/or of being turned completely over, within the supporting member 12, by the control cable means last mentioned.

Remote control means for operating the mirror from the inside of a vehicle on which it is mounted are shown in the last three drawing figures.

Figure 5:
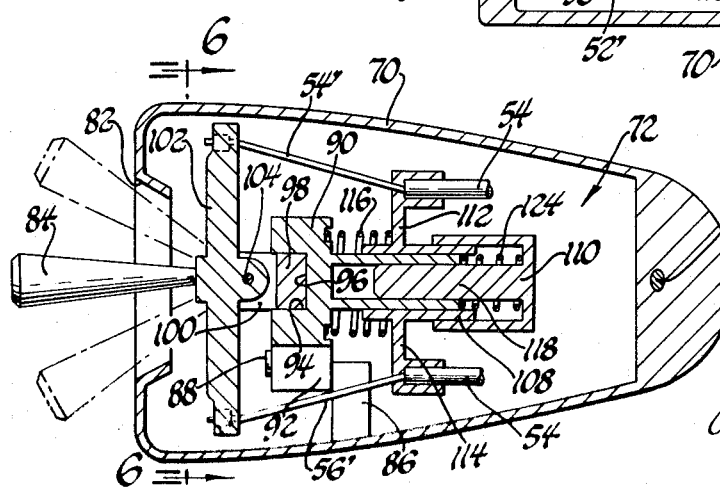
FIG. 5 is a side view, in cross-section, of the control means as seen in the plane of line 5—5 in the immediately preceding drawing figure.

A housing 70 is formed to inclose the control means 72 and to cover an opening 74 in the side wall panel 76 of the vehicle door, on the driver's side, or in a side wall panel forward thereof, the dashboard panel or any similarly convenient location for the operating mechanism. Screw fasteners 78 and 80 are provided at opposite ends of the housing to fix it to the wall panel 76 and there is an end opening 82 through which a control knob or lever 84 extends. The housing also includes bosses 86 on its inside wall (only one of which is shown in FIG. 5) for fastening the control means 72 to it as by the screw fastener 88.

Figure 6:
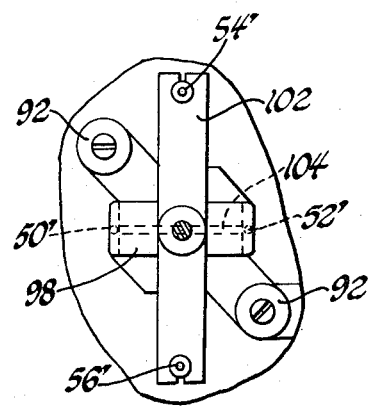
FIG. 6 is an end view of the control means, inside its cover housing, as seen in the plane of line 6—6 in the last mentioned drawing figure.
Figure 4:
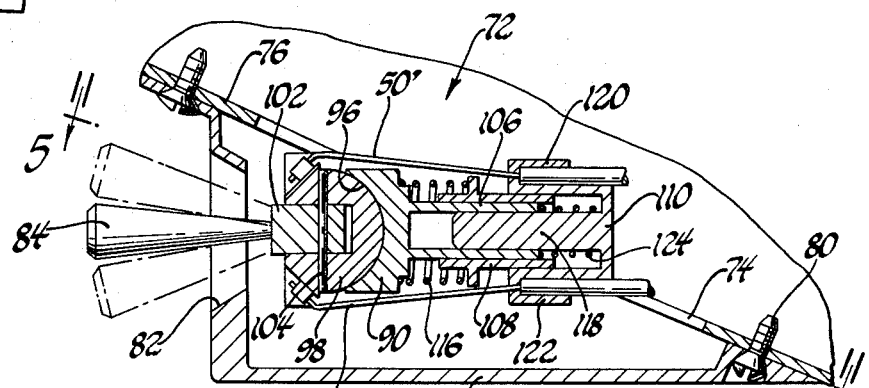
FIG. 4 is a cross-sectional top plan view of the mirror control means.

The control mechanism 72 includes a die cast or hard plastic part 90 that has mounting bosses 92 provided on it, as best seen in FIG. 6, for attachment to the cover housing 70. And, the attachment is made so that the part 90 is disposed centrally within the enclosing cover housing and extends rearwardly through the panel opening 74, as best shown in FIG. 4.

A horizontal slot 94 is provided within the front face of part 90 and it has a concave inner wall surface 96 in which a mating part 98 with a convex end wall surface is received and fitted for pivotal freedom of movement with light frictional resistance. The mating part 98 is in turn itself formed with a slot 100, which is vertical however, and a cross-arm member 102 is pinned to the part 100 in the slot, as at 104, for like freedom of pivotal movement with light side wall frictional resistance.

The back end of the housing supported part 90 is formed to provide a tubular projection 106 on which is guided two separate members 108 and 110 that have the sheathed ends of the control cables 50, 52, and 54 and 56 engaged to them.

The first cable guide member 108 includes arms 112 and 114, on opposite sides from each other, that extend out and have pockets in which the sheathes of cables 54 and 56 are received. The wire ends 54' and 56' pass through the arms and are connected to the ends of the cross-arm member 102. And a spring 116 holds the member 108 out from the part 90 and tight against the ends of the cable sheathes.

The second cable guide member 110 is like a cap received over the end of the first one and has a guide post 118 at its center that fits in the end of the tubular projection 106. It has receptive pockets 120 and 122 close at its sides, for the sheathed ends of control cables 50 and 52, and the wire ends 50' and 52' extend on and are engaged to opposite sides of the part 98. A spring 124 about the center post 118 in the guide cap engages the end of the support 90 and holds the guide member 110 out and tight against the ends of the cable sheathes received in it.

The purpose of the two springs 116 and 124 is to accommodate any growth in the length of the cable sheathes during assembly and installation; particularly with coiled wire type sheathes where expansion occures on the OD of a bend and no compensating contraction is possible at the ID. Others than this, the springs hold the ends of the sheathes as against a fixed abutment so that the wires in them are operative of the mirror.

FIG. 6 shows the cross-arm member 102 that is pivotal on the pin 104 and actuates the control wires 54' and 56' to set the viewing angle of the mirror 16 about its horizontal axis and that is used to turn it over. It also shows the pivoted part 98, in which the cross-arm member 102 is pinned, and which actuates the control wire 50' and 52' to set the viewing angle of mirror 16 by turning the mirror housing 26 about it vertical axis.

The control knob or lever 84 screws into a threaded hole at the center of the cross-arm-member 102 and is thereby capable of pivoting the cross-arm operator, as shown by the phantom views in FIG. 5, and the pivotal part 98 that is pinned to the cross-arm member, as shown by the phantom views in FIG. 4. The movements may be made simultaneously for relative adjustment of the viewing angle of the mirror, or separately. The control lever will normally be in either an upper disposed position or a lower disposed position for a day or night setting of the mirror and minor adjustments at which ever position the mirror is in will be all that will be necessary.

The lever arm length of the arms of member 102, that operates cables 54' and 56', is such that there is sufficient cable movement at the bight 62, at the mirror, to effect the desired result without any interference in the cover housing of the control means. The other cable operating member 98 is not required to have as much of a lever arm advantage in turning the mirror housing 26 and accordingly can have the cable ends fastened close on it.

Aside from the manufacturing advantage in the simplicity of parts, assembly is easier since fixed length cables and sheathes can be used, and installation is without concern for cable sheath growth. More important even, the horizontal setting obtained by member 98 is unaffected by vertical movement or adjustment in the use of cross-arm member 102. The cable ends 50' and 52' are connected to the member 98 at the pivotal axis of the cross-arm member, which is relatively at the ends of pin 104 and further assure against even adverse tremor is completely independent of the horizontal setting of the mirror.

Although only one preferred embodiment of the invention has been disclosed and described, it is apparent that other embodiments and modifications of the invention are possible within the scop of the appended claims.

I claim:

1. A mechanism for operating a remotely disposed rear view mirror assembly having fixed axes of pivotal support and which allows the operating mechanism and the mirror assembly to be preassembled with sheathed cables of fixed length attached therebetween, said operating mechanism including a supporting member having pivotal means provided at one end thereof and reciprocal means at the other end thereof, said pivotal means including a first member pivotal in a horizontal plane and a second member pivotal in a vertical plane and each having cable ends attached thereto, said reciprocal means including first and second members providing abutment shoulders for the ends of the cable sheathes and having spring means acting against the supporting member for holding said first and second members in yielding engagement therewith, and a control lever attached to one of said pivotal members for selected actuation of both thereof.

2. The operating mechanism of claim 1, said second pivotal member being pinned to said first pivotal member for retaining the two pivotal members together and having the second member pivotal on the first member.

3. The operating mechanism of claim 2, including means for restricting said first pivotal member to movement solely within a horizontal plane.

4. The operating mechanism of claim 1, said supporting member including a transverse slot receptive of said first pivotal member therewithin and for precluding other than horizontal movement of said member in said slot, and complimentary concave and convex inner wall surfaces formed in said slot and on said first pivotal member conducive of pivotal movement in a horizontal plane therebetween.

5. The operating mechanism of claim 1, said first reciprocal member being guided on said supporting member and said second reciprocal member being guided on both said supporting member and said first reciprocal member.

6. An operating mechanism for a remotely disposed rear view mirror assembly having fixed axes of pivotal support and which allows preassembly of the operating mechanism and mirror assembly with sheathed cables of fixed length therebetween, said operating mechanism comprising; a supporting member for attachment to a receptive vehicle wall panel to provide a stationary fixed support, a transverse slot formed in said supporting member across one end and having a first pivotal member received in said slot, said slot having opposite side walls precluding other than transverse movement of said first pivotal member in said slot and an inner wall surface conducive of pivotal movement of said first member as held in engagement therewith, a slot opening in said first pivotal member transversely therethrough and having a second pivotal member received and pinned for pivotal movement therewithin, means for attaching and fixing control cable ends to said first and second pivotal members on opposite sides of their respective pivotal axes, reciprocal means guided on the other end of said supporting member and formed to provide abutment shoulders for the ends of the sheathes about the control cables and to pass the cable ends therethrough, spring means in compression acting against said supporting member and on said reciprocal means for holding the latter in yielding engagement with the ends of said sheathes to relatively fix them as necessary for cable actuation therethrough, and a control lever attached to said second pivotal member for actuation thereof and for actuation of said first pivotal member therethrough.

* * * * *